(12) United States Patent
Lin et al.

(10) Patent No.: US 7,928,450 B2
(45) Date of Patent: Apr. 19, 2011

(54) PIXEL STRUCTURE AND METHOD FOR FABRICATING THE SAME

(75) Inventors: Hsiang-Lin Lin, Hsinchu (TW);
Liu-Chung Lee, Hsinchu (TW);
Kuo-Yu Huang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 1032 days.

(21) Appl. No.: 11/692,248

(22) Filed: Mar. 28, 2007

(65) Prior Publication Data
US 2008/0111138 A1    May 15, 2008

(30) Foreign Application Priority Data

Nov. 10, 2006    (TW) .............................. 95141650 A

(51) Int. Cl.
*H01L 29/72* (2006.01)
(52) U.S. Cl. ................ 257/83; 257/81; 257/91; 257/93; 257/98; 257/435; 257/E27.131; 345/92; 349/84
(58) Field of Classification Search ............... 257/81, 257/83, 91, 93, 98, 435, E27.131; 345/92; 349/84
See application file for complete search history.

(56) References Cited

U.S. PATENT DOCUMENTS

| 5,459,596 | A | 10/1995 | Ueda et al. |
| 5,600,461 | A | 2/1997 | Ueda et al. |
| 5,604,358 | A | 2/1997 | Kim |
| 6,750,836 | B1 * | 6/2004 | Katayama et al. ............. 345/92 |
| 2007/0170504 | A1 * | 7/2007 | Chang ............................ 257/347 |

FOREIGN PATENT DOCUMENTS

JP    5203994    8/1993

OTHER PUBLICATIONS

CN Office Action mailed Feb. 1, 2008.

* cited by examiner

*Primary Examiner* — Edward Wojciechowicz
(74) *Attorney, Agent, or Firm* — Thomas/Kayden

(57) ABSTRACT

A pixel structure is disclosed. The pixel structure includes a substrate, a first data line having at least one end formed on the substrate, a first insulation layer overlying the first data line and exposing a part of the end of the first data line, a shielding electrode disposed on the first insulation layer and overlapped with the first data line, a second data line formed on the first insulation layer and electrically connected to the exposed end of the first data line, a second insulation layer overlying the shielding electrode and the second data line, and a pixel electrode formed on the second insulation layer and overlapped with the shielding electrode. The invention also provides a method for fabricating the pixel structure.

8 Claims, 17 Drawing Sheets

PIXEL STRUCTURE AND METHOD FOR FABRICATING THE SAME

BACKGROUND OF THE INVENTION

1. Field of the Invention

The invention relates to a semiconductor structure, and in particular to a pixel structure and a method for fabricating the same.

2. Description of the Related Art

In liquid crystal display fabrication, the aperture ratio of pixels affects utilization of backlight and panel brightness. The aperture ratio is determined by the interval between the conductive electrode and data line. However, the capacitance between pixel and data line (Cpd) may increase when the interval is small, resulting in crosstalk.

To reduce capacitance between pixel and data line (Cpd), methods can include, for example, increasing storage capacitance to reduce the ratio of Cpd in total capacitance of a sub-pixel, disposing a stable electric shield between the pixel electrode and data line to reduce the parasitic capacitance therebetween, and utilizing an organic low-k insulation film (K=2.7~3.5) formed by the photo-imaged or spin on glass (SOG) methods provided by Optical Imaging Systems (OIS) to reduce the capacitance between pixel and data line.

However, increasing the area of the storage capacitor may reduce the aperture ratio. Also, the organic low-k insulation film with strong water adsorption, yellowing, and low interface adhesion may affect yield and throughput.

FIG. 1A is a top view of a conventional pixel structure. FIG. 1B is a cross sectional view taken along A-B line of FIG. 1A. A pixel structure 1 comprises two insulation layers such as a gate insulation layer 2 and a passivation layer 3, and two metal layers. One of the metal layers is fabricated to form a gate line 4 and a common line 5. Another metal layer is fabricated to form a data line 6 and a source/drain 7. In the structure, the parasitic capacitance between the data line 6 and the pixel electrode 8 can be reduced due to a proper interval therebetween. A large black matrix, however, is required to sufficiently shield the light leak region, thus decreasing the aperture ratio.

BRIEF SUMMARY OF THE INVENTION

In one aspect, the invention provides a pixel structure comprising a substrate, a first data line having at least one end formed on the substrate, a first insulation layer overlying the first data line and exposing a part of the end of the first data line, a shielding electrode disposed on the first insulation layer and overlapped with the first data line, a second data line formed on the first insulation layer and electrically connected to the exposed end of the first data line, a second insulation layer overlying the shielding electrode and the second data line, and a pixel electrode formed on the second insulation layer and overlapped with the shielding electrode.

In another aspect, the invention also provides a method for fabricating a pixel structure, in which a substrate is provided. A scan line extending in a first direction and a first data line extending in a second direction are formed on the substrate. A first insulation layer is formed on the substrate, overlying the scan line and the first data line. A patterned semiconductor layer is formed on the first insulation layer. A shielding electrode and a second data line are formed on the first insulation layer and a source and a drain are formed on the patterned semiconductor layer, wherein the shielding electrode overlaps the first data line and the second data line is electrically connected to the end of the first data line. A second insulation layer is formed over the shielding electrode, the second data line, the source, and the drain. An opening is formed to expose the drain. A pixel electrode is formed on the second insulation layer, wherein the pixel electrode is electrically connected to the drain through the opening and overlaps the shielding electrode.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
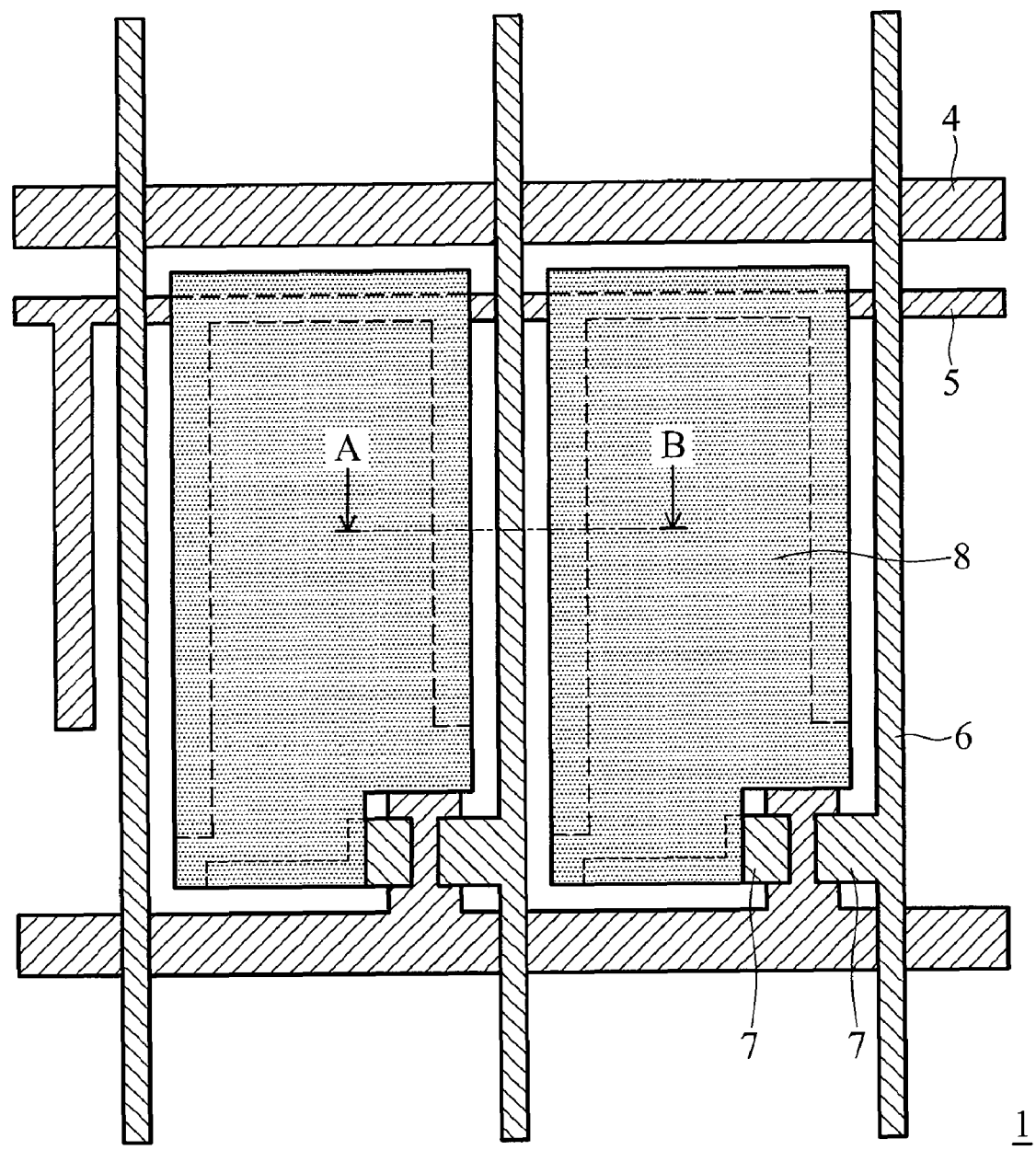
FIG. 1A is a top view of a conventional pixel structure.
Figure 1B:
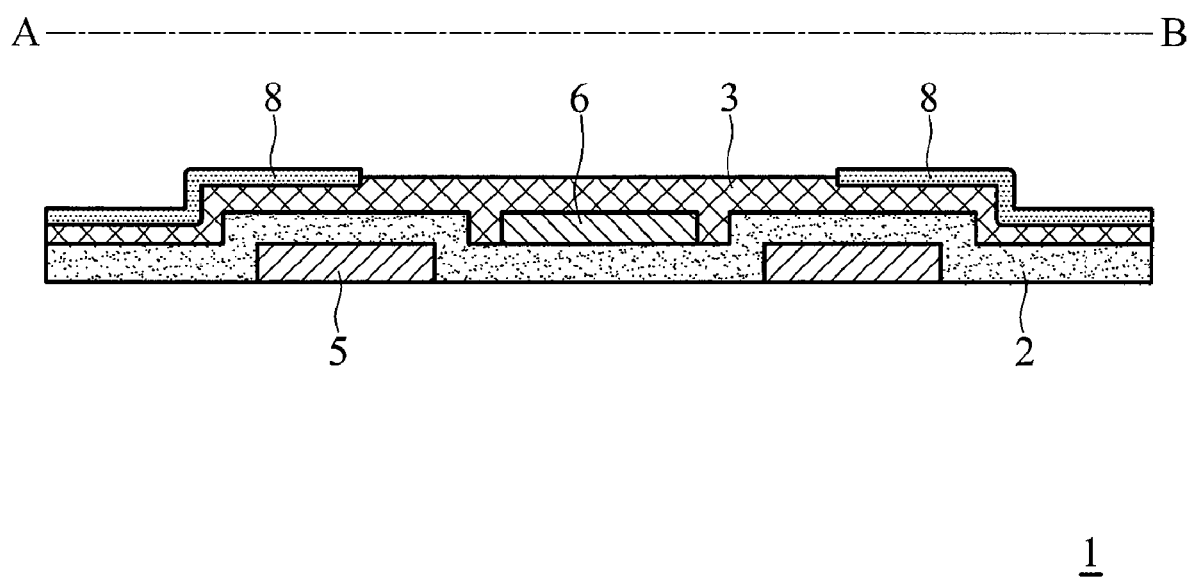
FIG. 1B is a cross sectional view taken along A-B line of FIG. 1A.
Figure 2A:
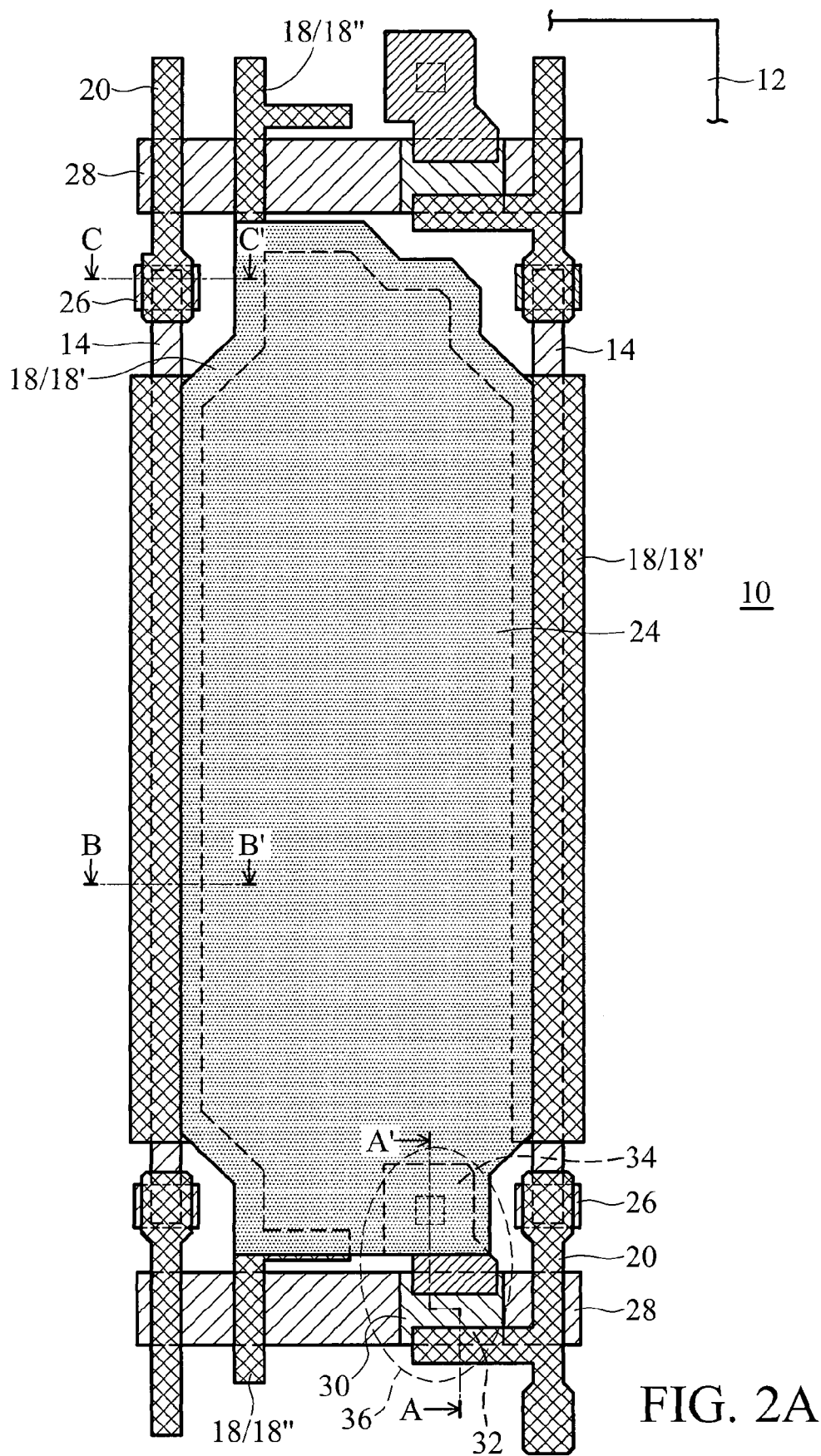
FIG. 2A is a top view of a pixel structure of the invention.
Figure 2B:
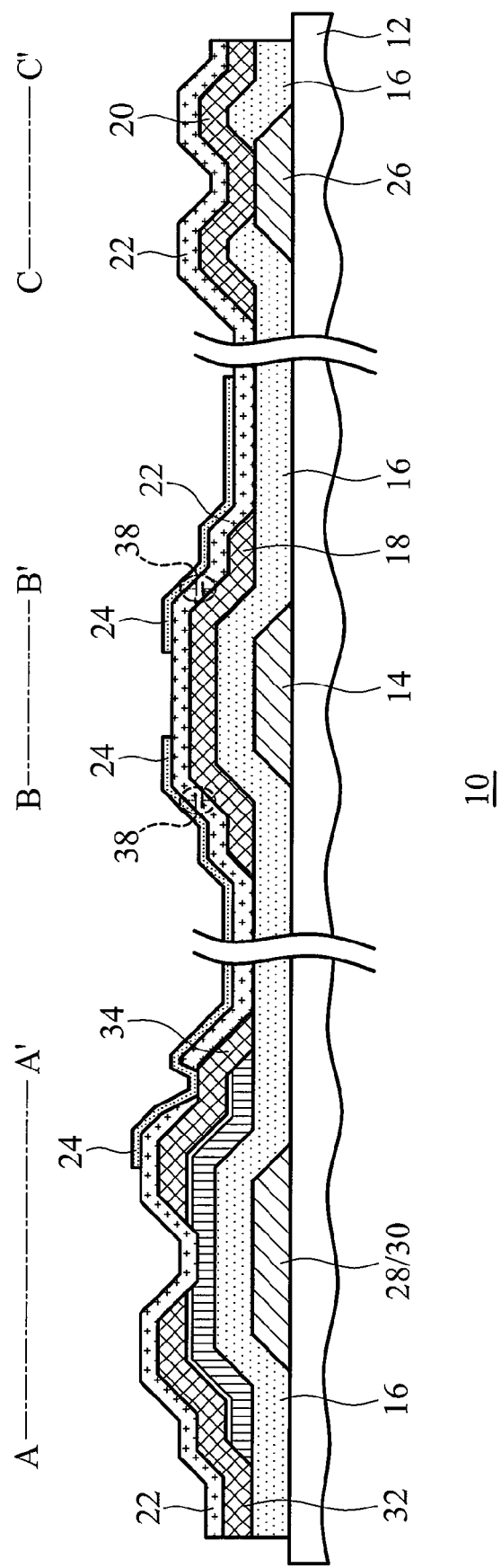
FIG. 2B is a cross sectional view taken along A-A', B-B', and C-C' lines of FIG. 2A.

FIG. 2A is a top view of a pixel structure of the invention. FIG. 2B is a cross sectional view taken along A-A', B-B', and C-C' lines of FIG. 2A. The pixel structure 10 comprises a substrate 12, a first data line 14, a first insulation layer 16, a shielding electrode 18, a second data line 20, a second insulation layer 22, and a pixel electrode 24.

The first data line 14, having at least one end 26, is formed on the substrate 12. The first insulation layer 16 overlies the substrate 12 and the first data line 14 to expose a part of the end 26 thereof. The shielding electrode 18 is disposed on the first insulation layer 16 and overlaps the first data line 14. The second data line 20 is formed on the first insulation layer 16 and electrically connected to the exposed end 26 of the first data line 14. Specifically, the first data line 14 and the second data line 20 form one data line. The second insulation layer 22 overlies the shielding electrode 18 and the second data line 20. The pixel electrode 24 is formed on the second insulation layer 22 and overlaps a part of the shielding electrode 18.

Referring to FIG. 2A, the pixel structure 10 further comprises a scan line 28 intersecting the second data line 20 formed on the substrate 12. The pixel structure 10 further comprises a thin film transistor 36 having a gate 30 electrically connected to the scan line 28, a source 32 electrically connected to the second data line 20, and a drain 34 electrically connected to the pixel electrode 24. The shielding electrode 18 exhibits a network comprising a first sub-shielding electrode 18' extending along a first direction and across the first data line 14, and a second sub-shielding electrode 18" extending along a second direction across the scan line 28. A part of the second sub-shielding electrode 18" in the second direction overlaps with the first data line 14. Additionally, the scan line 28 and the first data line 14 are composed of the same metal layer. The shielding electrode 18, the second data line 20, the source 32, and the drain 34 are composed of the same metal layer.

The two-dimensional network structure of the shielding electrode provides a uniform electric potential and avoids weak lines caused by break or short of conventional one-dimension shielding electrode.

The shielding electrode 18, overlapping the first data line 14, is located between the pixel electrode 24 and the first data line 14 and shields the electric field produced from the first data line 14, as shown in FIG. 2B. A storage capacitor 38 is formed between the shielding electrode 18 and the pixel electrode 24, as shown in FIG. 2A & FIG. 2B. The storage capacitor 38 is formed between the pixel electrode 24 and the first sub-shielding electrode 18' and the second sub-shielding electrode 18".

A conventional structure including a shielding electrode, a pixel electrode and a data line sandwiched between the shielding electrode and the pixel electrode is replaced with the structure disclosed, which comprises a data line, a pixel electrode and a shielding electrode sandwiched between the data line and the pixel electrode, without additional metal conductive films and insulation layers, reducing cost and increasing throughput. Additionally, the stray capacitance produced form the electric field of the data line is reduced and the storage capacitance is increased, acquiring an optimal quality of pixel output.

FIGS. 3A~3G, cross sectional views taken along A-A', B-B', and C-C' lines of FIG. 2A, disclose a method for fabricating the pixel structure of the invention.

Figure 3A:
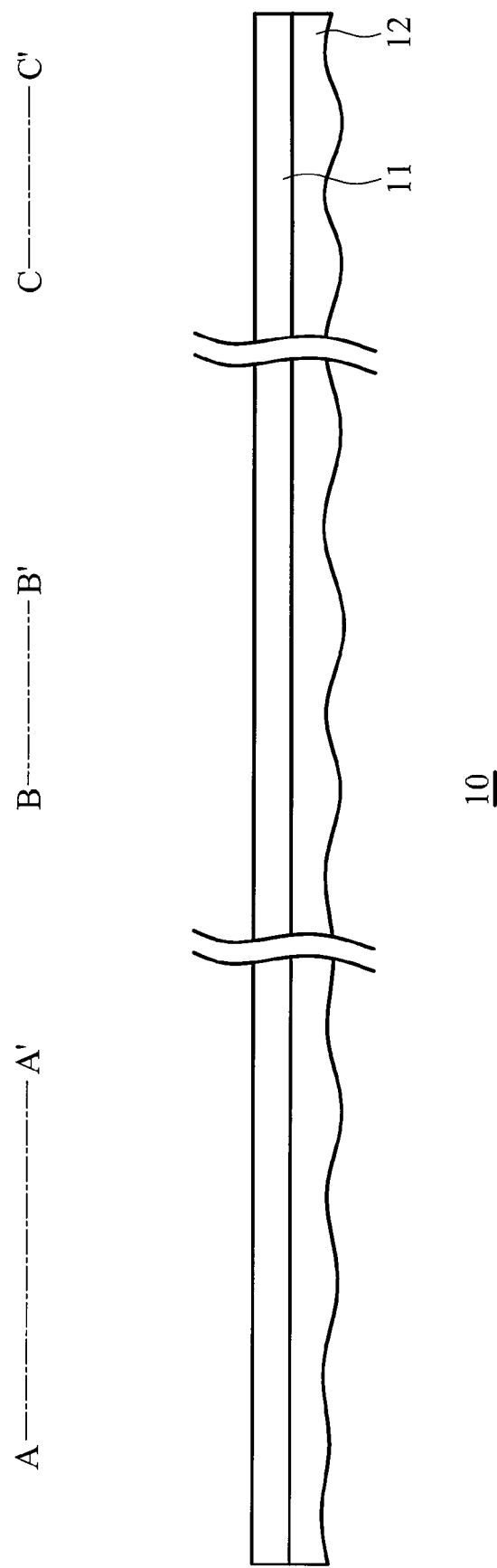
FIGS. 3A~3G are cross sectional views illustrating a method for fabricating a pixel structure according to one embodiment of the invention.

Referring to FIG. 3A, a first metal layer 11 is formed on a substrate 12.

Figure 3B:
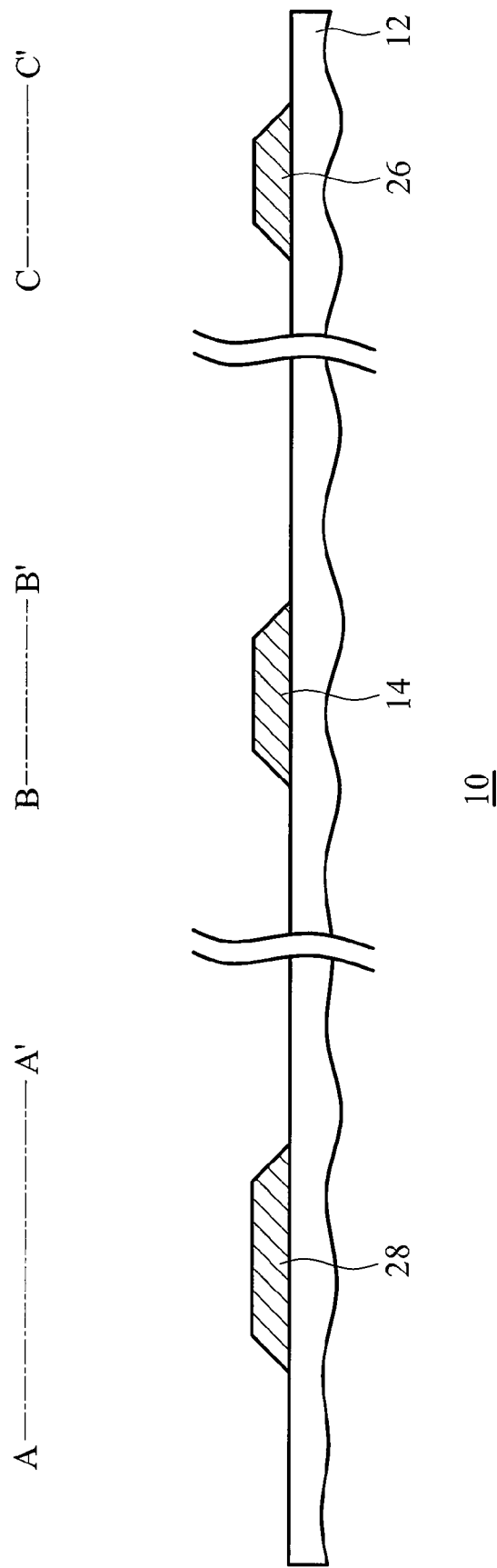

Referring to FIG. 3B, the first metal layer 11 is patterned to form a scan line 28 and a first data line 14 having at least one end 26 on the substrate 12. The scan line 28 extends in a first direction (as shown in FIG. 2A), and the first data line 14 extends in a second direction (as shown in FIG. 2A). The scan line 28 and the first data line 14 do not intersect with each other.

Figure 3C:
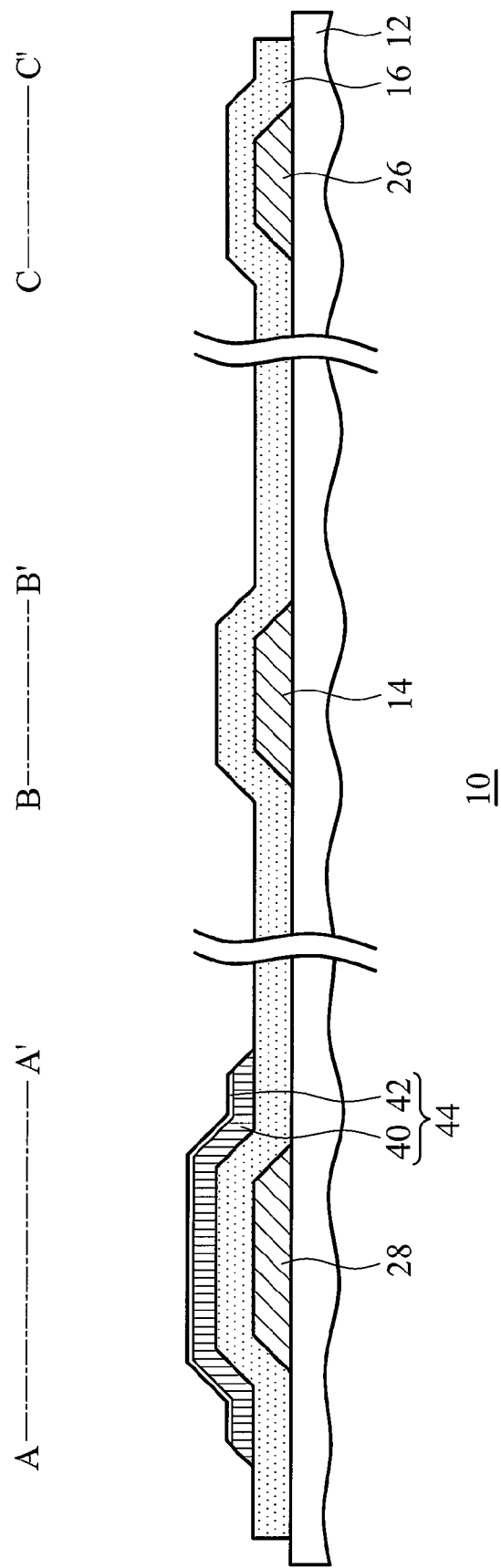

Referring to FIG. 3C, a first insulation layer 16 is formed on the substrate 12, overlying the scan line 28 and the first data line 14. A channel layer 40 is then formed on the first insulation layer 16. Next, an ohmic contact layer 42 is formed on the channel layer 40. The channel layer 40 and the ohmic contact layer 42 constitute a semiconductor layer. The semiconductor layer is then patterned to form a patterned semiconductor layer 44.

Figure 3D:
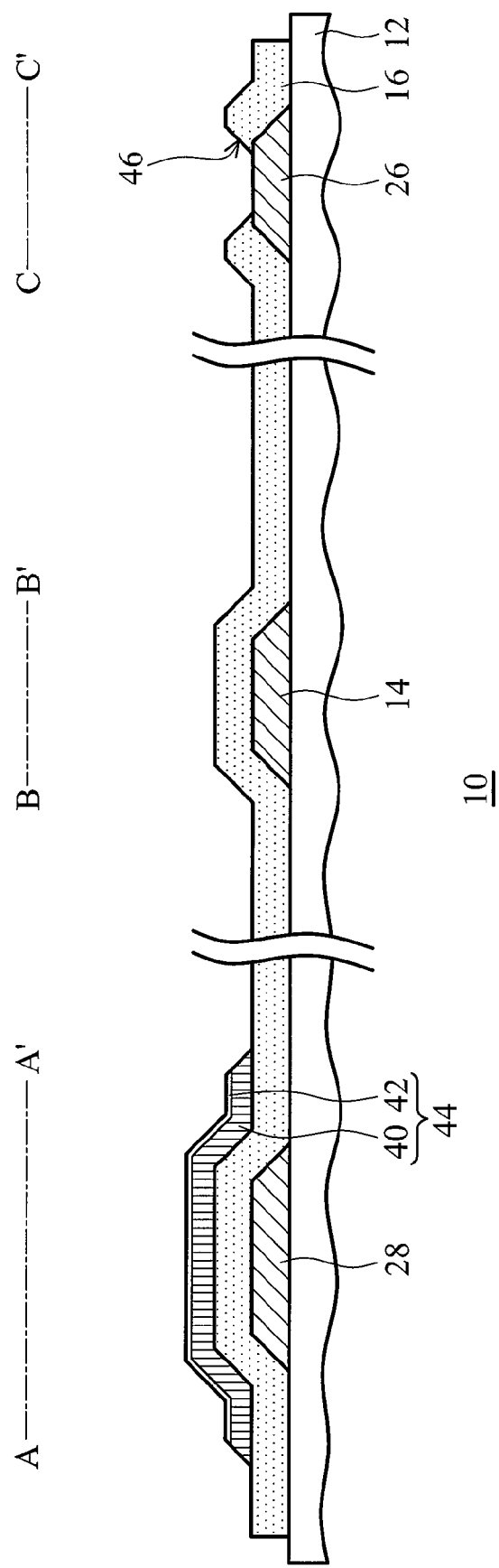

Referring to FIG. 3D, a first opening 46 is formed to expose the end 26 of the first data line 14.

Figure 3E:
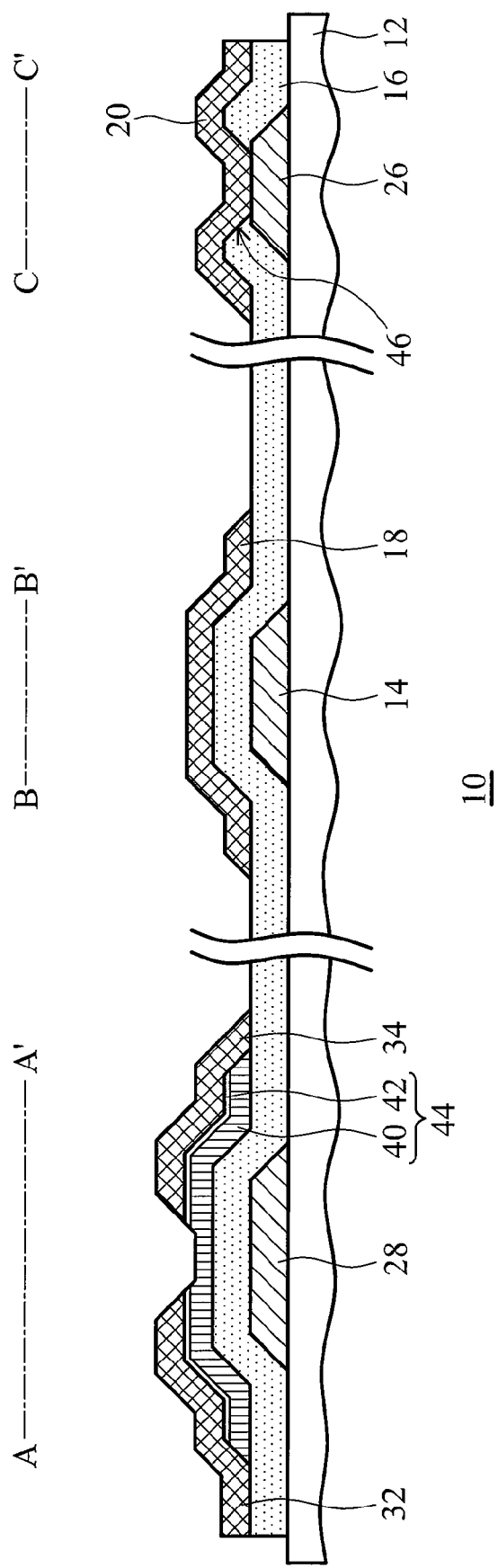

Referring to FIG. 3E, a second metal layer (not shown) is formed on the first insulation layer 16 and the semiconductor layer 44. Next, the second metal layer is patterned to form a shielding electrode 18 and a second data line 20 on the first insulation layer 16 and to form a source 32 and a drain 34 on the semiconductor layer 44. The semiconductor layer 44 contacts the source 32 and the drain 34 through the ohmic contact layer 42. The shielding electrode 18 overlaps the first data line 14. The second data line 20 is electrically connected to the end 26 of the first data line 14 through the first opening 46.

Figure 3F:
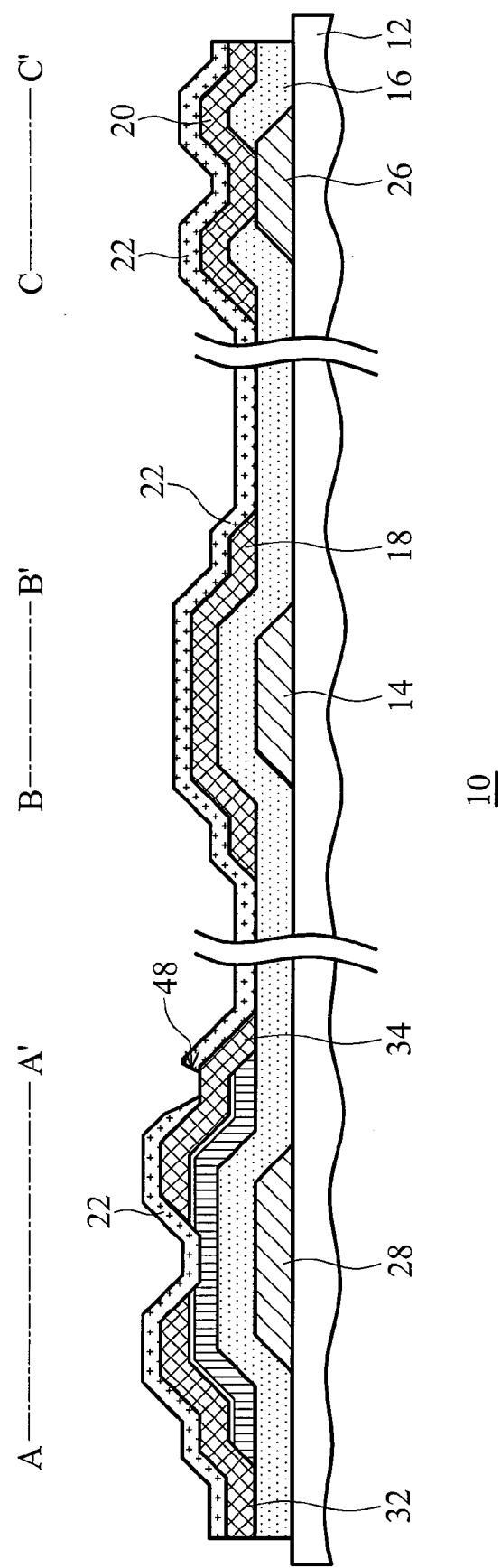

Referring to FIG. 3F, a second insulation layer 22 is formed over the shielding electrode 18, the second data line 20, the source 32, and the drain 34. A second opening 48 is then formed to expose the drain 34.

Figure 3G:
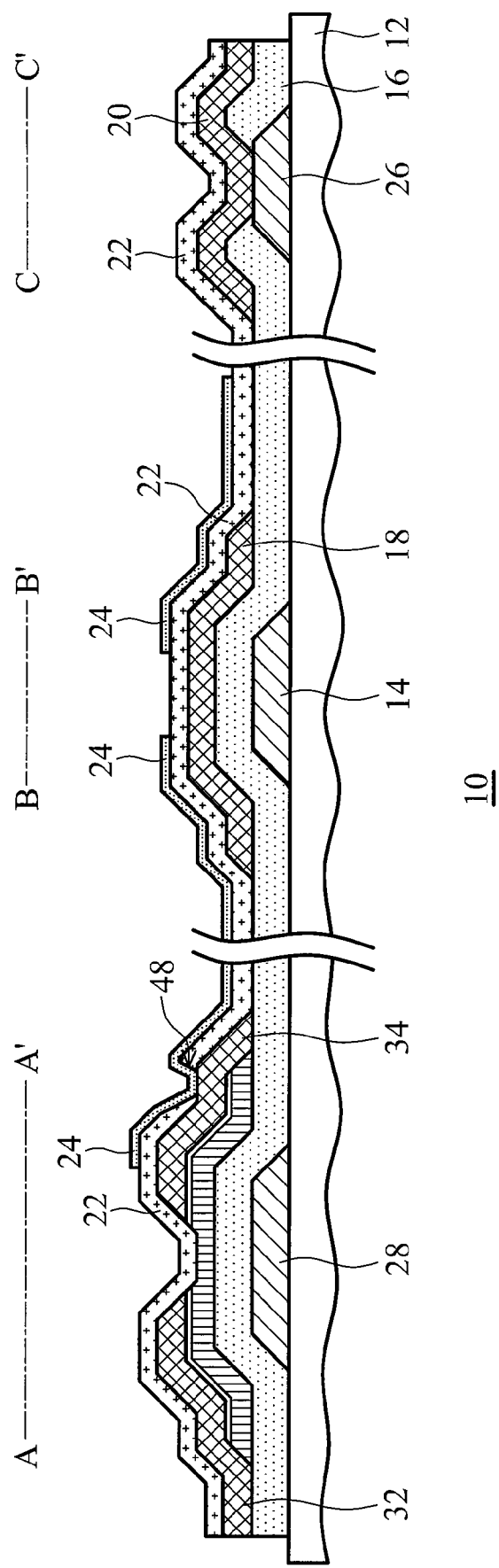

Referring to FIG. 3G, a pixel electrode 24 is formed on the second insulation layer 22. The pixel electrode 24 is electrically connected to the drain 34 through the second opening 48 and overlaps the shielding electrode 18.

FIGS. 4A~4F, cross sectional views taken along A-A', B-B', and C-C' lines of FIG. 2A, disclose a method for fabricating the pixel structure of the invention.

Figure 4A:
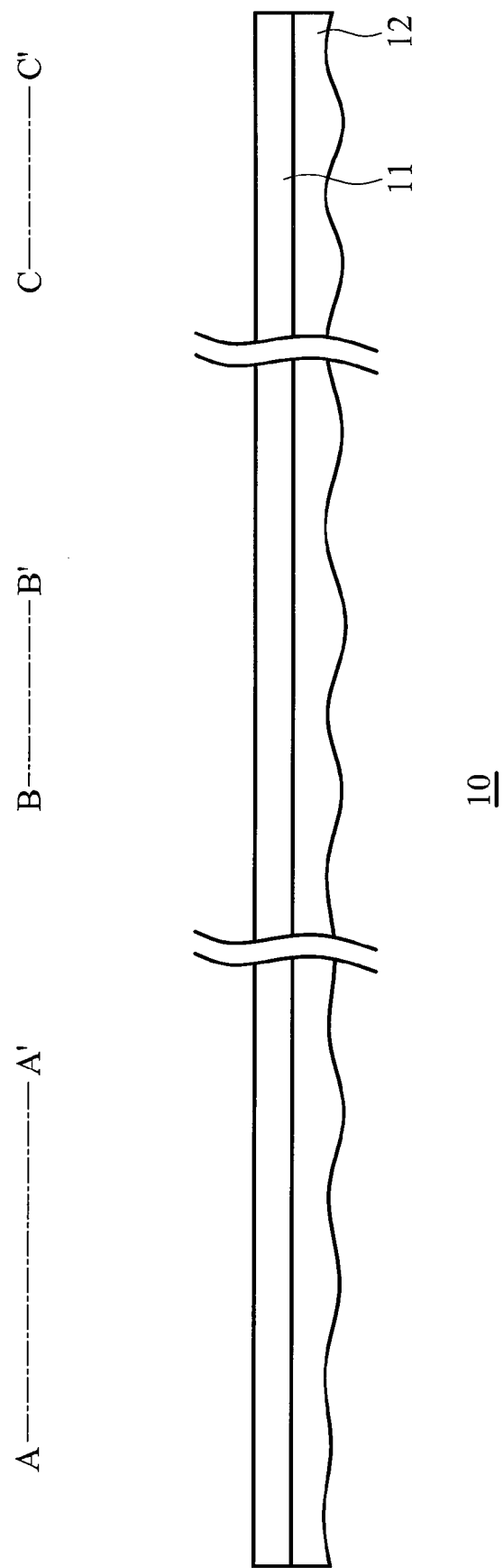
FIGS. 4A~4F are cross sectional views illustrating a method for fabricating a pixel structure according to another embodiment of the invention.

Referring to FIG. 4A, a first metal layer 11 is formed on a substrate 12.

Figure 4B:
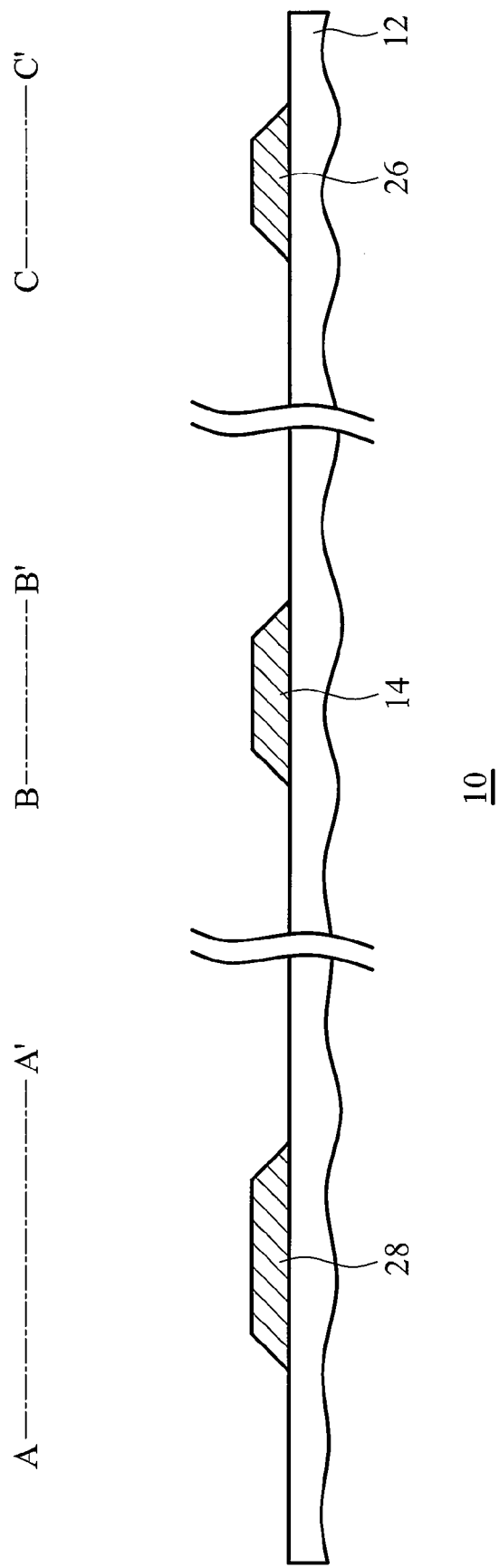

Referring to FIG. 4B, the first metal layer 11 is patterned to form a scan line 28 and a first data line 14 having at least one end 26 on the substrate 12. The scan line 28 extends in a first direction (as shown in FIG. 2A), and the first data line 14 extends in a second direction (as shown in FIG. 2A). The scan line 28 and the first data line 14 do not intersect with each other.

Figure 4C:
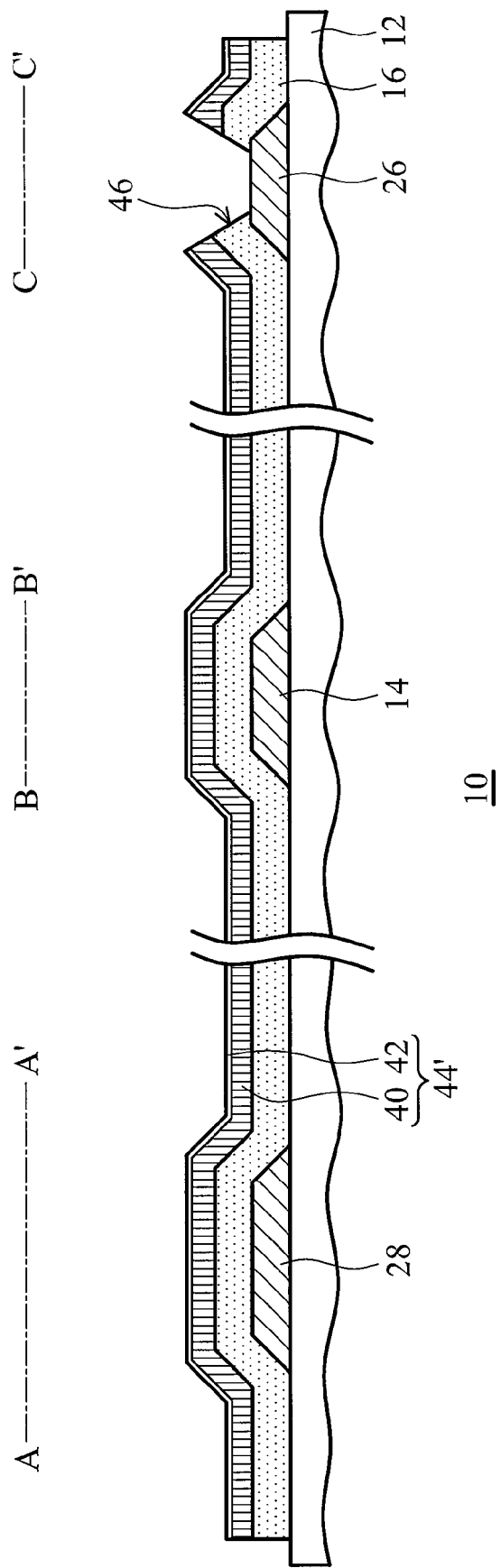

Referring to FIG. 4C, a first insulation layer 16 is formed on the substrate 12, overlying the scan line 28 and the first data line 14. A channel layer 40 is then formed on the first insulation layer 16. Next, an ohmic contact layer 42 is formed on the channel layer 40. The channel layer 40 and the ohmic contact layer 42 constitute a semiconductor layer 44'. A first opening 46 is then formed to expose the end 26 of the first data line 14.

Figure 4D:
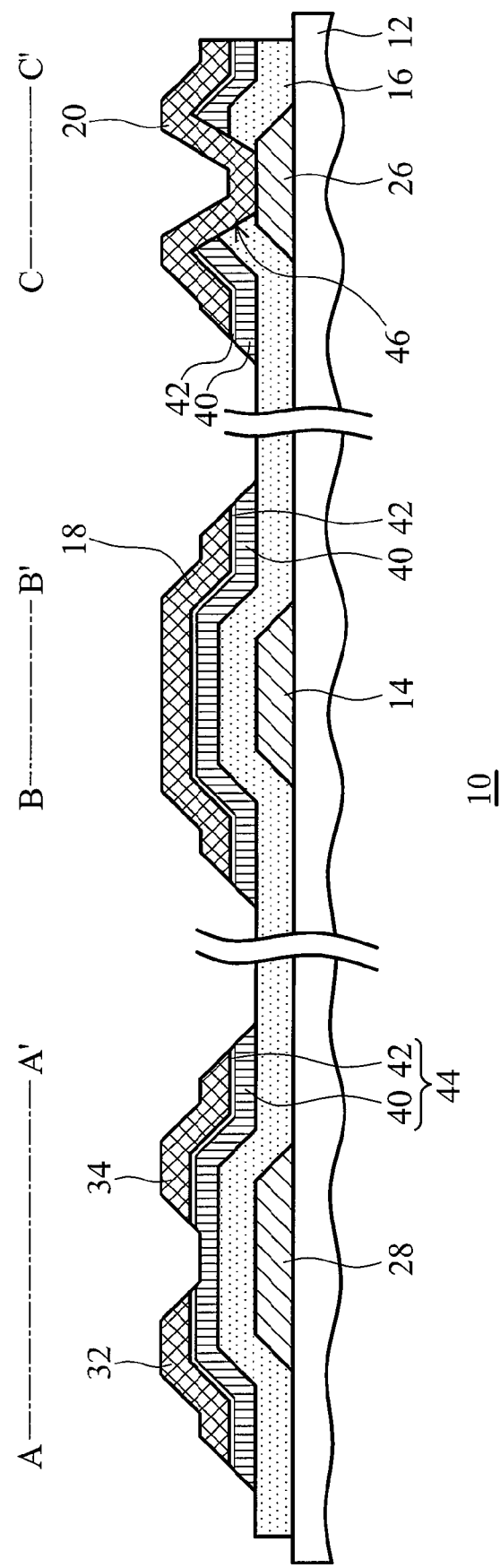

Referring to FIG. 4D, a second metal layer (not shown) is formed on the semiconductor layer 44'. Next, the second metal layer and the semiconductor layer 44' are defined by a half-tone or gray-tone mask to form a patterned semiconductor layer 44, a shielding electrode 18, a second data line 20, a source 32 and a drain 34. The patterned semiconductor layer 44 contacts the source 32 and the drain 34 through the ohmic contact layer 42. The shielding electrode 18 overlaps the first data line 14. The second data line 20 is electrically connected to the end 26 of the first data line 14 through the first opening 46.

Compared to FIG. 3C, the patterned semiconductor layer 44 in FIG. 4D is simultaneously formed with the shielding electrode 18, the second data line 20, the source 32, and the drain 34, that is, which are defined by one mask.

Figure 4E:
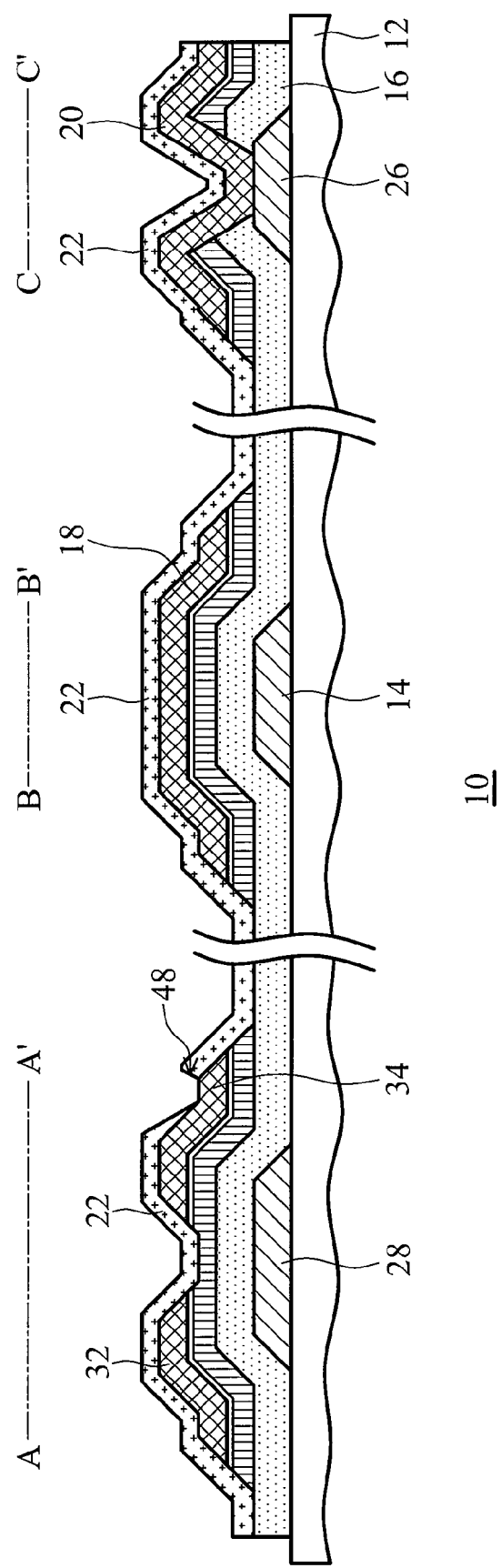

Referring to FIG. 4E, a second insulation layer 22 is formed over the shielding electrode 18, the second data line 20, the source 32, and the drain 34. A second opening 48 is then formed to expose the drain 34.

Figure 4F:
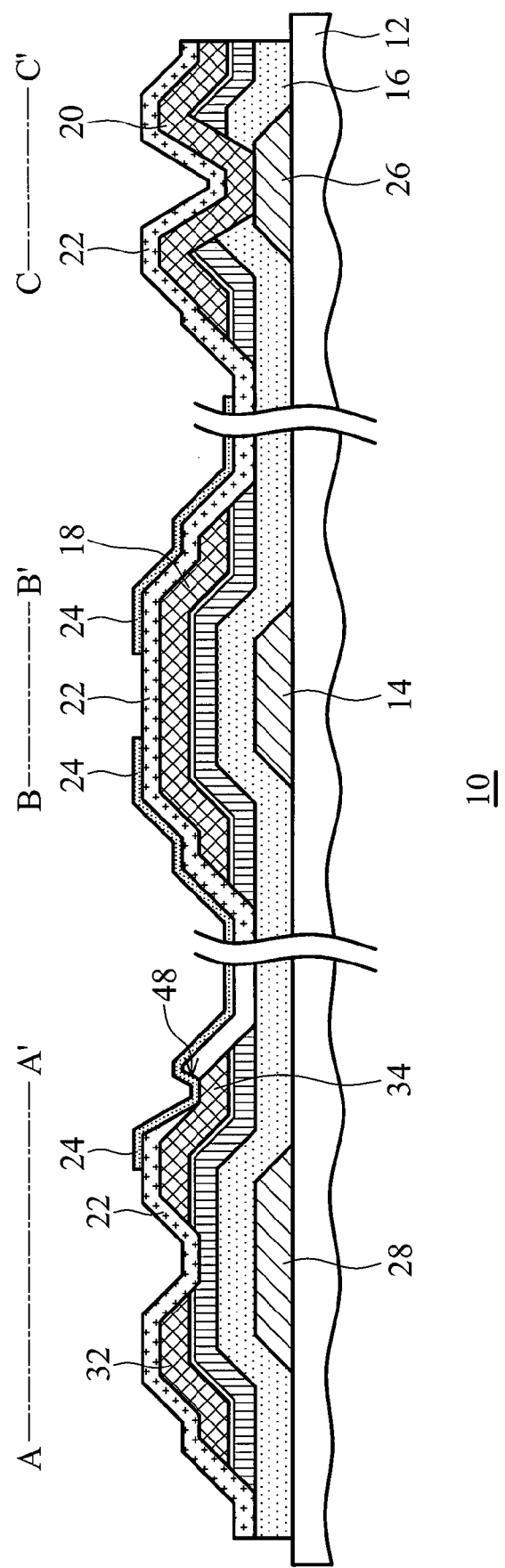

Referring to FIG. 4F, a pixel electrode 24 is formed on the second insulation layer 22. The pixel electrode 24 is electrically connected to the drain 34 through the second opening 48 and overlaps the shielding electrode 18.

The shielding electrode formed above the data line shields the electric field produced from the data line. Additionally, a storage capacitor is formed between the shielding electrode and the pixel electrode, thus effectively increasing the aperture ratio. Also, high storage capacitance is obtained due to the decreased insulation layer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure, comprising:
   a substrate;
   a first data line having at least one end, disposed on the substrate;
   a first insulation layer overlying the first data line and exposing a part of the end of the first data line;
   a shielding electrode disposed on the first insulation layer and overlapped with the first data line;

a second data line formed on the first insulation layer and electrically connected to the exposed end of the first data line;

a second insulation layer overlying the shielding electrode and the second data line;

a pixel electrode formed on the second insulation layer and overlapped with the shielding electrode;

a scan line formed on the substrate and intersecting the second data line; and a thin film transistor having a gate electrically connected to the scan line, a source electrically connected to the second data line, and a drain electrically connected to the pixel electrode.

2. The pixel structure as claimed in claim 1, wherein the shielding electrode overlapping the first data line is located between the pixel electrode and the first data line.

3. The pixel structure as claimed in claim 1, wherein the shielding electrode shields an electric field produced from the first data line.

4. The pixel structure as claimed in claim 1, further comprising a storage capacitor formed between the shielding electrode and the pixel electrode.

5. The pixel structure as claimed in claim 1, wherein the scan line and the first data line are made of the same metal layer.

6. The pixel structure as claimed in claim 1, wherein the shielding electrode, the second data line, the source, and the drain are made of the same metal layer.

7. The pixel structure as claimed in claim 1, wherein the shielding electrode is a network.

8. A pixel structure, comprising:

a substrate;

a first data line having at least one end, disposed on the substrate;

a first insulation layer overlying the first data line and exposing a part of the end of the first data line;

a shielding electrode disposed on the first insulation layer and overlapped with the first data line;

a second data line formed on the first insulation layer and electrically connected to the exposed end of the first data line;

a scan line formed on the substrate and intersecting the second data line;

a second insulation layer overlying the shielding electrode and the second data line; and a pixel electrode formed on the second insulation layer and overlapped with the shielding electrode, wherein the shielding electrode comprises a first sub-shielding electrode extending along a first direction and across the first data line, and a second sub-shielding electrode extending along a second direction and across the scan line.

* * * * *